US012662933B2

(12) United States Patent (10) Patent No.: US 12,662,933 B2
Jin et al. (45) **Date of Patent: \*Jun. 23, 2026**

(54) INTEGRATED HOUSING ELECTRONICS FOR WIRELESS TELEMETRY SYSTEM OF DRILLING UNIT

(71) Applicant: Underground Magnetics, Inc., Johnston, IA (US)

(72) Inventors: Yuyang Jin, Johnston, IA (US); Yuriy Khapochkin, Johnston, IA (US)

(73) Assignee: Underground Magnetics, Inc., Johnston, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/978,454

(22) Filed: Dec. 12, 2024

(65) Prior Publication Data

US 2025/0179915 A1 Jun. 5, 2025

Related U.S. Application Data

(63) Continuation of application No. 17/483,102, filed on Sep. 23, 2021, now Pat. No. 12,203,364.

(60) Provisional application No. 63/170,831, filed on Apr. 5, 2021.

(51) Int. Cl.
*E21B 47/13* (2012.01)
*E21B 7/26* (2006.01)
*G01V 11/00* (2006.01)

(52) U.S. Cl.
CPC ............ *E21B 47/13* (2020.05); *G01V 11/002* (2013.01)

(58) Field of Classification Search
None
See application file for complete search history.

(56) References Cited

U.S. PATENT DOCUMENTS

| | | | |
|---|---|---|---|
| 9,611,732 B2 | 4/2017 | Rempe et al. | |
| 10,151,171 B2 | 12/2018 | Noske et al. | |
| 10,563,502 B1 | 2/2020 | Phillips et al. | |
| 12,203,364 B2 * | 1/2025 | Jin .......................... | E21B 7/267 |
| 2003/0155915 A1 | 8/2003 | Kruspe et al. | |
| 2010/0013728 A1 | 1/2010 | Harak et al. | |
| 2013/0176137 A1 * | 7/2013 | Kolpack ............... | E21B 47/024 |
| | | | 340/854.3 |
| 2014/0022088 A1 * | 1/2014 | Chau ...................... | E21B 47/10 |
| | | | 340/854.1 |
| 2014/0265619 A1 | 9/2014 | Chau et al. | |

(Continued)

*Primary Examiner* — Steven Lim
*Assistant Examiner* — Jerold B Murphy
(74) *Attorney, Agent, or Firm* — Erik M. Antonson; Advent, LLP

(57) ABSTRACT

A drill string tool can be used in a drilling system, with the drill string tool configured for wireless communication. The drill string can include a central structural member, a wire coil, an antenna core, and a wear protection shell. The antenna core can surround the central structural member. The wire coil can be positioned around an outside of the antenna core, with the antenna core and the wire coil forming an antenna assembly. The antenna assembly can be configured to wirelessly transmit the data signals from electronics associated with the drill string tool. The wear protection shell can surround the antenna assembly and be configured to minimize a formation of eddy currents therein during operation of the antenna assembly. In an embodiment, the drill string tool can be a drill head wireless transmitter.

18 Claims, 9 Drawing Sheets

314

(56)                    References Cited

U.S. PATENT DOCUMENTS

| | | |
|---|---|---|
| 2014/0368198 A1 | 12/2014 | Espinosa et al. |
| 2016/0356146 A1 | 12/2016 | Gard et al. |
| 2018/0179887 A1 | 6/2018 | Clarkson |
| 2020/0212576 A1 | 7/2020 | Ma et al. |

* cited by examiner

Transmitter transmits message with F1 — 150

Transceiver1 receives msg with F1 and transmits with F2 — 152

Transceiver2 receives msg with F2 and transmits with F3 — 154

Transceiver-m receives msg with Fm and transmits with Fn — 156

Some distance away, locator receives msg with Fn — 158

Locator sends msg to a display via a radio above ground — 160

INTEGRATED HOUSING ELECTRONICS FOR WIRELESS TELEMETRY SYSTEM OF DRILLING UNIT

RELATED APPLICATIONS

This application is a continuation under 35 U.S.C. § 120 of U.S. patent application Ser. No. 17/483,102, filed Sep. 23, 2021, and titled "INTEGRATED HOUSING ELECTRON- ICS FOR WIRELESS TELEMETRY SYSTEM OF DRILL- ING UNIT," which claims domestic priority to U.S. Provi- sional Application No. 63/170,831, filed on Apr. 5, 2021, and entitled "INTEGRATED HOUSING ELECTRONICS FOR WIRELESS TELEMETRY SYSTEM OF DRILLING UNIT." This application is related to a U.S. Provisional Application No. 63/170,813, filed on Apr. 5, 2021, and entitled "WIRELESS TELEMETRY SYSTEM FOR HORI- ZONTAL DIRECTIONAL DRILLING." The contents of these applications are hereby incorporated by reference thereto.

BACKGROUND

In the horizontal directional drilling (HDD) industry, data transmission from a drill head to an HDD machine incor- porates a walk-over locator with radio-frequency (RF) telemetry to track the drill head or uses a wireline tool to provide a direct communications link to the HDD machine. In a walk-over locator case, the locator above the ground can receive information from an underground transmitter asso- ciated with the drill head. The information can then be transmitted from the walk-over locator to the HDD machine via a RF channel. In wireline case, transmitter information is transmitted back to the HDD machine via a wireline transmission cable that extends through the pipe stream (e.g., extending within the connected drill rods making up the pipe stream).

DRAWINGS

The Detailed Description is described with reference to the accompanying figures.

DETAILED DESCRIPTION

Figure 1A:
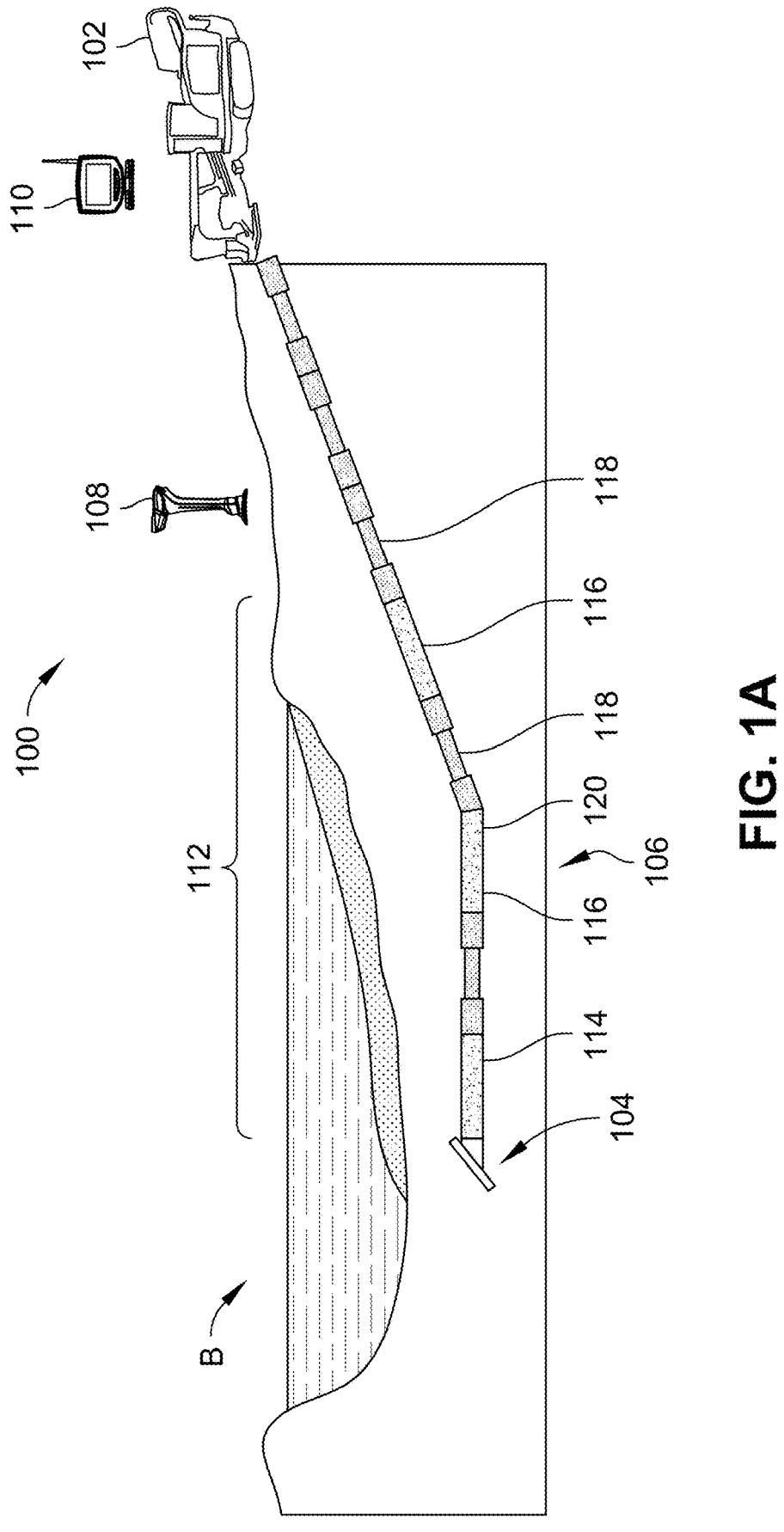
FIGS. 1A and 1B are schematic, side views of an HDD machine in an operational setting, in accordance with an example embodiment of the present disclosure, differing in the position of the nearest-to-the-drill drill head wireless transmitter relative to an overlying blocking obstruction.

Aspects of the disclosure are described more fully here- inafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete and will fully convey the scope.
Overview Both walk-over locator and wireline transmission com- munication methods can have their limitations. Walk over locator telemetry is simple and reliable if a walk over locator is close enough to the transmitter (e.g., associated with the drill head and/or sonde of the drill) to receive the transmitter information. But in many cases, a locator can be too far from the transmitter to receive the transmitter information. A river crossing, a highway crossing, and/or a railroad track cross- ing are examples of locations where an operator cannot walk over the transmitter. Wireline tool transmission uses a wire- line to communicate transmitter information to the HDD machine. But this method requires the wire to be cut and then reconnected (e.g., via soldering thereof) for each added drill rod in a given drill rod string. It may not only be very time consuming but also often presents reliability issues. Any connection failure can lead to pulling back some or all drill rods to reconnect the wire.

The present disclosure can provide a wireless data telem- etry system in and above the ground for the data commu- nication from a drill bit and/or sonde of a drilling system. The present wireless data telemetry system does not solely depend on a walk-over locator to receive communications from a drill head transmitter. Further, the present wireless data telemetry system does not need a wireline for commu- nicating data to an HDD drill rig. The drill head wireless transmitter and the at least one data link transceiver of the present wireless data telemetry system can together wire- lessly communicate one or more data signals beyond a transmission range that the drill head wireless transmitter alone may have and communicate those signals along at least a portion of the drill string (e.g., bringing the data signal into range of a walk-over unit and/or a drill display). The wireless data telemetry may not only save tedious work otherwise needed to connect and/or reconnect wireline for each of the drill rods, but it can also provide a much more reliable data communication channel from the drill head to at least one of a walk-over locator or the HDD machine itself.

In horizontal drill applications, generally a transmitter is a separate part of the drill housing. Typically, there is a chamber in the drill housing that houses the transmitter. Much, if not most of, the transmitting energy of the trans- mitter can be lost in the housing due to eddy current formation. Due to the size limits of the housing, the trans- mitting antenna usually is small in size, which can also limit the transmitting efficiency.

In an embodiment, the drill head wireless transmitter and/or any of the data link transceivers can employ a structure which places a given antenna outside of a structural inner member (e.g., a steel pipe), yet shielded by a non-magnetic (e.g., plastic, non-conductive composite, ceramic) outer housing to reduce eddy currents and thereby improve antenna efficiency (e.g., transmission range of at least 150 meters). Further, placement of antenna in an area outside the rest of the electronics can facilitate the use of a larger antenna (e.g., larger diameter and/or length), helping to improve the communication range thereof. In an embodiment, that non-magnetic outer housing may include, for example, two to six slots to minimize eddy current formation and/or may be in the form of a replaceable sleeve.

Example Embodiments

Figure 1B:
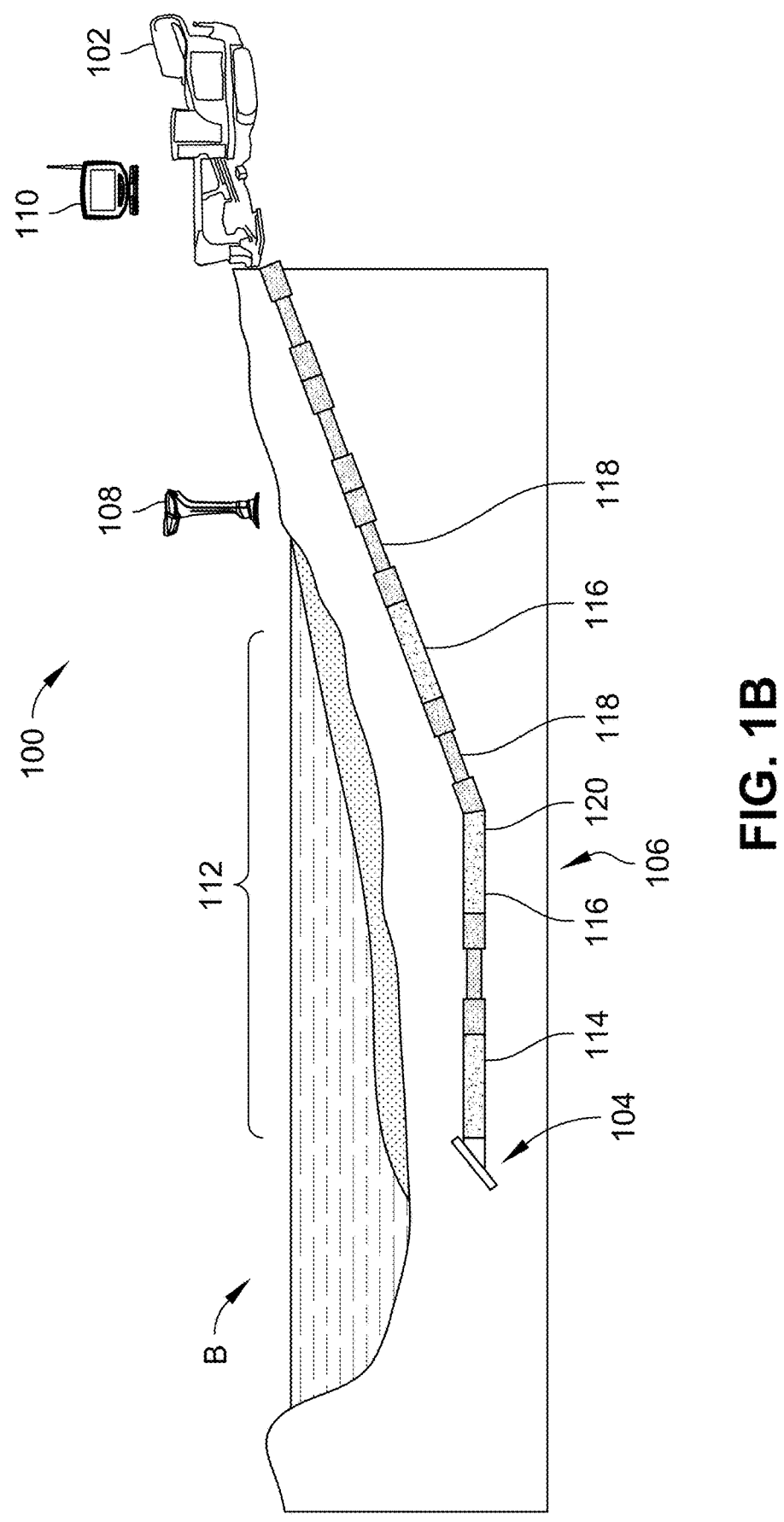

FIGS. 1A and 1B illustrate a drilling system 100 (e.g., an HDD (horizontal directional drilling) system per the illustration), in accordance with the present disclosure. In an embodiment, the drilling system 100 can include a drilling rig 102 (e.g., an HDD drilling rig per the illustration), a drill head 104, a drill string 106 (e.g., a plurality of interconnected (e.g., via screw threading) drill pipes or drill rods), a walk-over locator 108, a drilling display 110, and a wireless data telemetry system 112. The wireless data telemetry system 112 can further include a drill head wireless transmitter 114 (e.g., a sonde) incorporated in the drill head 104 and one or more data link transceivers 116 releasably mounted (e.g., via screw threading) within the drill string 106. The drill head wireless transmitter 114 can generate and transmit one or more data signals collectable by the drill head 104 and corresponding to, for example, pitch, yaw, roll, acceleration, ground temperature, and/or moisture level measurements, depending on the sensor capabilities of the sonde. The drill string 106 can include a plurality of drill pipes or drill rods 118 (for purposes of this disclosure, the terms drill pipe and drill rod may be used interchangeably), in addition to the one or more data link transceivers 116. In an embodiment, the drill string 106 is releasably coupled (e.g., via screw threading) to the drilling rig 102. In an embodiment, each opposed end of a given data link transceiver is configured to be releasably coupled (e.g., via screw threading) to a corresponding drill pipe or drill rod 118.

In an embodiment, the drill head wireless transmitter 114 and the at least one data link transceiver 116 can be configured to be physically coupled (e.g., via screw threading) within a drill string 106 so as to be spaced apart from one another via one or more intervening drill rods 118. In an embodiment, as shown in FIG. 1A, at least one drill head wireless transmitter 114 is laterally out of range of an overlying blocking obstruction B (e.g., a river, a highway, or a railroad) and, thereby, in walk-over range of the walk-over locator 108. In an embodiment, as shown in FIG. 1B, the wireless data telemetry system 112 can be used to transmit data to at least a location (e.g., a position of a walk-over locator 108) that is outside a range of the blocking obstruction B (e.g., a river, a highway, or a railroad), even though the nearest drill head wireless transmitter may, as illustrated in FIG. 1B, still be laterally below the blocking obstruction B. In such an instance, the nearest drill head wireless transmitter 114 (e.g., relative to the walk-over locator 108 and/or the drill rig 102) may be laterally under the blocking obstruction B but still within transmission distance of, for example, the walk-over locator 108 (e.g., within 200-300 feet, depending on the signal transmission strength). It is to be understood that the drilling display 110 may be configured to communicate and/or process data, in addition to serving as a physical display and/or an input/output device (e.g., touch screen and/or toggle buttons).

Figure 2:
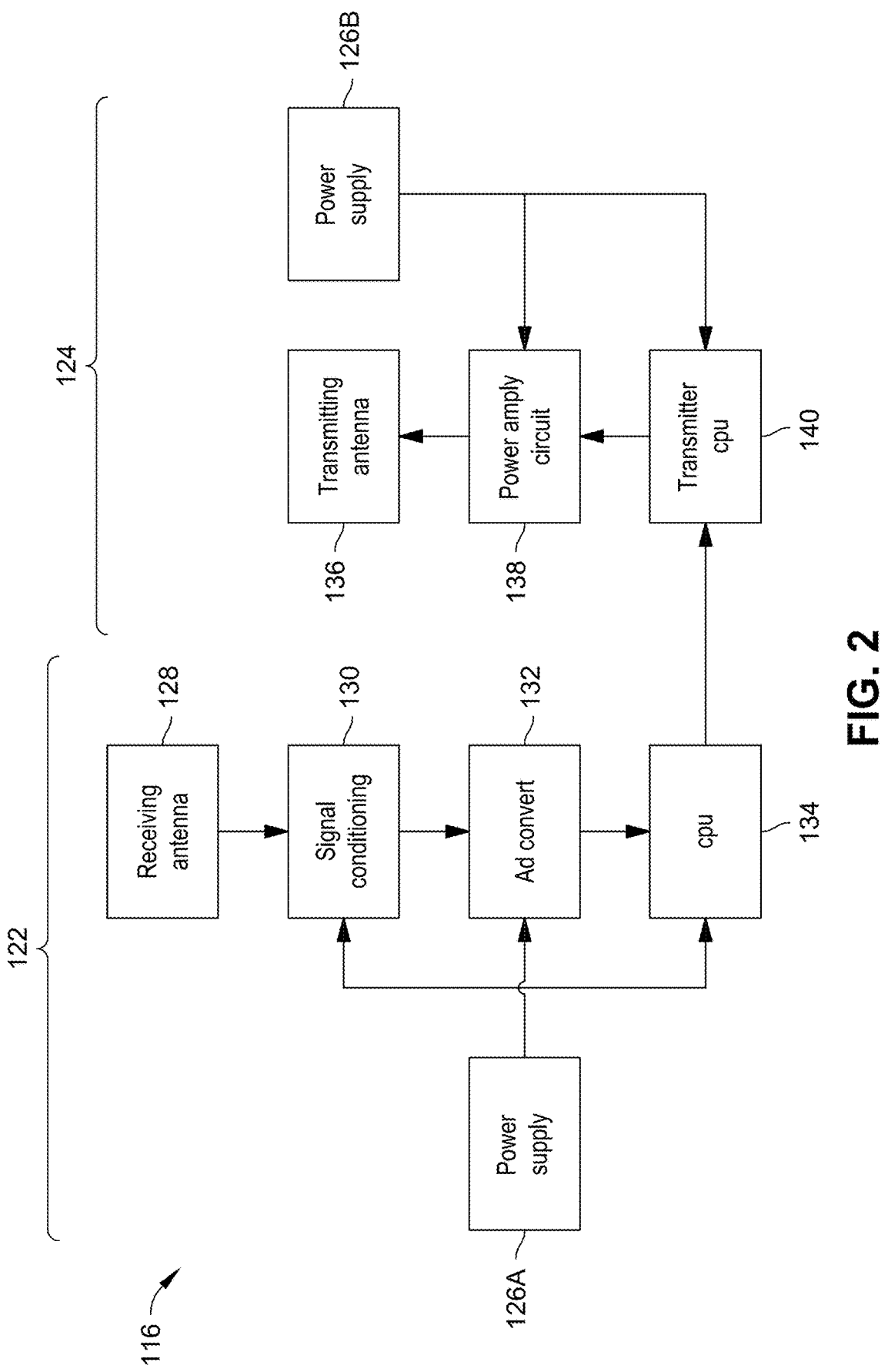
FIG. 2 is a schematic view of a data link transceiver, in accordance with an example embodiment of the present disclosure.

Each data link transceiver 116 of the wireless data telemetry system 112 can include a hollow outer encasement 120, a RF transceiver 122, a RF transmitter 124, and at least one power supply 126 (e.g., one or more sets of batteries), as shown in FIGS. 1 and 2. The outer encasement 120 can be in the form of a steel body (e.g., similar in diameter (within 5-10%) and material as a drill pipe or rod 118) or another body able to withstand the rigors of a drilling environment. In an embodiment, the outer encasement 120 can be approximately a same length as a drill pipe or rod 118. In an embodiment, each data link transceiver 116 and each section of drill pipe or rod 118 is similar in length (e.g., within 1-3 inches of one another). In an embodiment, at least data link transceiver 116 may be shorter than a given drill pipe or rod 118 (e.g., being sufficiently long to house the components thereof but otherwise compact). The outer encasement 120 of each data link transceiver 116 can be configured to be coupled at either end thereof (e.g., via screw threading) to another drill pipe or rod 118 (e.g., also screw-threaded at the ends thereof) or another data link transceiver 116. In an embodiment, each data link transceiver 116 and drill pipe or rod 118 may include one male threaded end and one female threaded end (not specifically shown).

As shown in FIG. 2, the RF transceiver 122 of a given data link transceiver 116 can include a first power supply 126A, a receiving antenna 128, a signal conditioning unit 130 (e.g., an electronic circuit that manipulates a signal in a way that prepares it for the next stage of processing), an analog-to-digital (AD) signal converter 132, and a transceiver central processing unit (CPU) 134, where such elements are electrically and/or electronically (e.g., wired or wirelessly) coupled with one another, as needed for operability (e.g., power and/or communication). In an embodiment, the receiving antenna 128 can be configured to receive a data signal (e.g., from at least one of the drill-head wireless transmitter 114 or a given RF transmitter 124), and the signal conditioning unit 130 can be configured to manipulate the data signal into a form receivable by the AD signal converter 132. The AD signal converter 132 can be configured to communicate the digitally converted signal to the transceiver CPU 134.

As further shown in FIG. 2, the RF transmitter 124 of the data link transceiver 116 can include a second power supply 126B, a transmitting antenna 136, a power amplifying circuit 138, and a transmitter CPU 140, where such elements are electrically and/or electronically (e.g., wired or wirelessly) coupled with one another, as needed for operability. In an embodiment, the RF transmitter 124 can be configured to relay one or more signals received by the receiving antenna 128 of the corresponding RF transceiver 122 of the data link transceiver 116. In an embodiment, the transmitter CPU 140 can receive data from the corresponding transceiver CPU 134 via a communicative coupling (e.g., wired or wireless) therebetween (not labelled). The transmitter CPU 140 can output one or more data signals to the power amplifying circuit 138, with the power amplifying circuit 138 relaying the one or more data signals to the transmitting antenna 136 for broadcast to at least one of: another data link transceiver 116, an HDD drilling rig 102, a walk-over locator 108, or a drilling display 110.

It is to be understood that the functionality of the transceiver CPU 134 and the transmitter CPU 140 may be integrated (e.g., into a single CPU) and/or that the functionality of the power units 126A, 126B may be accomplished by a single power unit (e.g., one set of batteries), with such variants being within the scope of the present disclosure. In an embodiment, the transmitting antenna 136 can have an underground RF transmission range of at least 100 meters (m). In an embodiment, the various components of a given data link transceiver 116 can be electrically and communicatively coupled, as needed, by wired connections, as wire connections are generally simple and reliable.

In an embodiment, one or more data link transceivers 116 can be releasably mounted within the drill string 106, each at a distance from the drill head wireless transmitter 114 and/or a nearest other data link transceiver 116. In an embodiment, the one or more data link transceivers 116 can effectively boost the signal along at least a portion of the drill string 106 to a location where it may be detected by a walk-over locator 108 and/or at the HDD drill rig 102. In an embodiment, a first data link transceiver 116 can be placed between and connected to a pair of drill rods 118 at a distance behind the drill head wireless transmitter 114. In an embodiment, the first data link transceiver 116 can be located between the drill head wireless transmitter 114 and the HDD drill rig 102 yet close enough to the drill head wireless transmitter 114 to clearly communicate therewith (e.g., sufficiently strong signal and/or low enough noise/signal interference). In an embodiment, one or more additional data link transceivers 116 can be included within the drill string 106 at spaced intervals from the first data link transceiver 116 to relay and/or boost the data signal(s) communicated via the wireless data telemetry system 112. In an embodiment, the drill head wireless transmitter 114 and/or any of the data link transceivers 116 can be about 150 feet (ft) apart from one another and still be sufficiently close to communicate with one another. In an embodiment, the drill head wireless transmitter 114 and/or any of the data link transceivers 116 can be as much as 100-150 m apart from one another while in the ground and effectively communicate with one another. In an embodiment, the combined operation of the drill head wireless transmitter 114 and the one or more data link transceivers 116 can facilitate wireless transmission of signals to a location along the drill string 106 that is at least 150 m away (e.g., 200 m, 300 m, 1000 m) from the signal origination point (i.e., at the drill head wireless transmitter 114). In an embodiment, the drill head wireless transmitter 114 and/or any of the data link transceivers 116 communicate using Bluetooth or another short-range wireless communication technology.

In an embodiment, a given data link transceiver 116 can have a wireless communication range of at least 100 meters (m), due, at least in part, to the efficiency of the transmitting antenna 136. In an embodiment, the drill head wireless transmitter 114 and/or any of the data link transceivers 116 can employ technology like that disclosed in U.S. patent application Ser. No. 15/509,417 (the contents of which are incorporated by reference) to achieve the desired communication range. In an embodiment, the drill head wireless transmitter 114 and/or any of the data link transceivers 116 can employ a structure which places a given antenna outside of a structural inner member (e.g., a steel pipe), yet shielded by a non-magnetic (e.g., plastic, non-conductive composite, ceramic) outer housing to reduce eddy currents and thereby improve antenna efficiency (e.g., transmission range of at least 150 meters). In an embodiment, that non-magnetic outer housing may include, for example, two to six slots to minimize eddy current formation and/or may be in the form of a replaceable sleeve. It is to be understood that the possible separation distance between such components can increase with improvements in wireless communication technology (e.g., antenna technology).

In operation, the first data link transceiver 116 of the wireless data telemetry system 112 can receive drill head transmitter information from the drill head wireless transmitter 114. Then the first data link transceiver 116 can transmit the information to any additional data link transceivers 116 following the first. In turn, each successive data link transceiver 116 can receive the information from the one located prior to it and relay that information to any next data link transceiver 116 following it. A walk-over locator/receiver 108 can receive the transmitted/relayed information from any sufficiently close data link transceiver 116 (e.g., data signal(s) are sufficiently strong enough to be detected and registered by the walk-over locator 108). Then, the walk-over locator 108 can transmit the drill head information to a remote drilling display 110 via a RF radio connection. In another embodiment, enough data link transceivers 116 may be provided to facilitate direct wireless communication with the drilling display 110 (e.g., effectively serving in a similar manner as a wireline connection without the deficiencies associated with that type of a connection). Further, while in operation, the one or more data link transceivers 116 may be selectively turned on and off or otherwise provided with a sleep/awake mode to save energy from the power supply (e.g., 126A, 126B). For example, a sleep mode may be selectably enacted while a walk-over locator 108 is within sufficient range to communicate with the drill head wireless transmitter 114 and/or while the drill string 106 and the drill head 104 are undergoing rotation.

Figure 3:
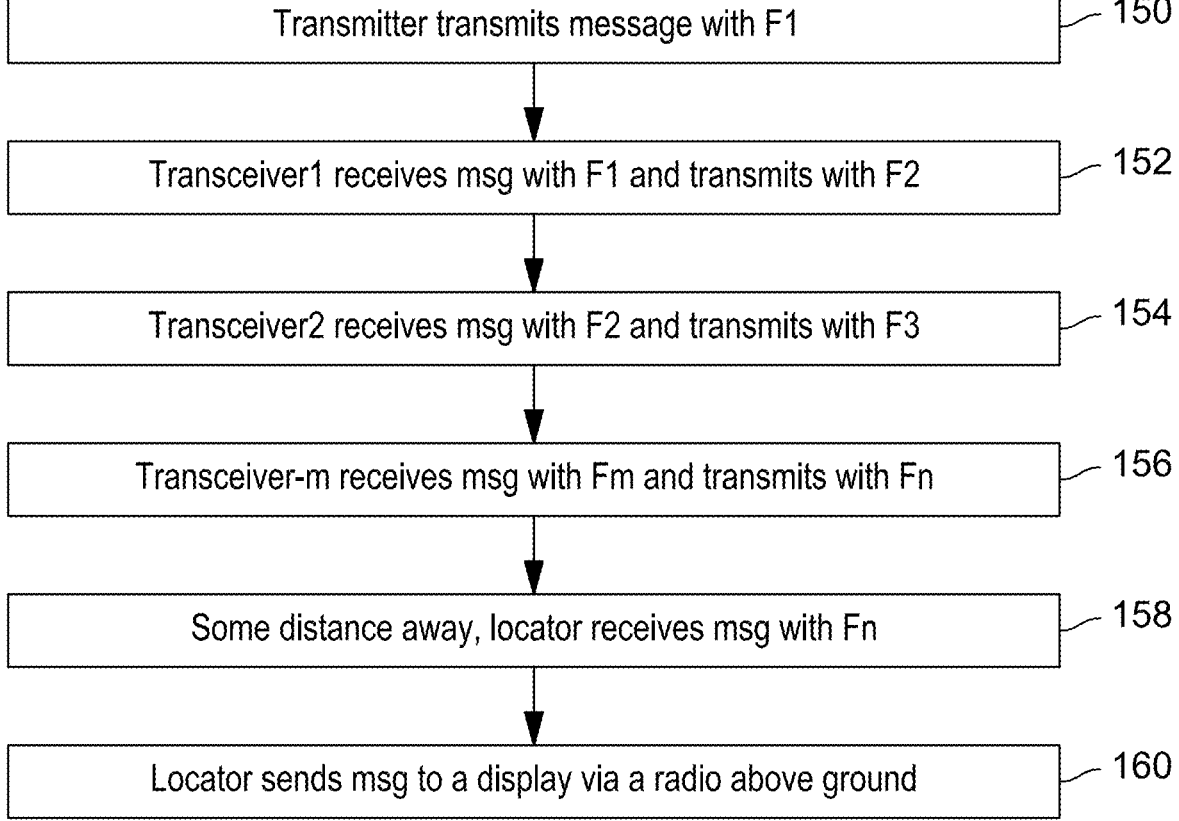
FIG. 3 is a flow chart illustrating the operation of a wireless telemetry system, in accordance with an example embodiment of the present disclosure.

The operation of the wireless data telemetry system 112 is further illustrated in FIG. 3, which focuses on the signal flow through the system. In step 150, the transmitter (e.g., 114) can transmit a message with F1. The transceiver 1 (e.g., 116 (a first one nearest 114)) can receive the message with F1 and transmit it with F2, in step 152. The transceiver 2 (e.g., a $2^{nd}$ of 116) can receive the message with F2 and transmit with F3, in step 154. Proceeding to further transceivers, for example, transceiver-m can receive the message with Fm and transmit with Fn, in step 156. At some distance away, a locator (e.g., 108) can receive the message with Fn, in step 158. Finally, the locator (e.g., 108) can send the message to a display (e.g., 110) or another suitable location via a radio (RF) transmission above ground, in step 160.

Figure 4:
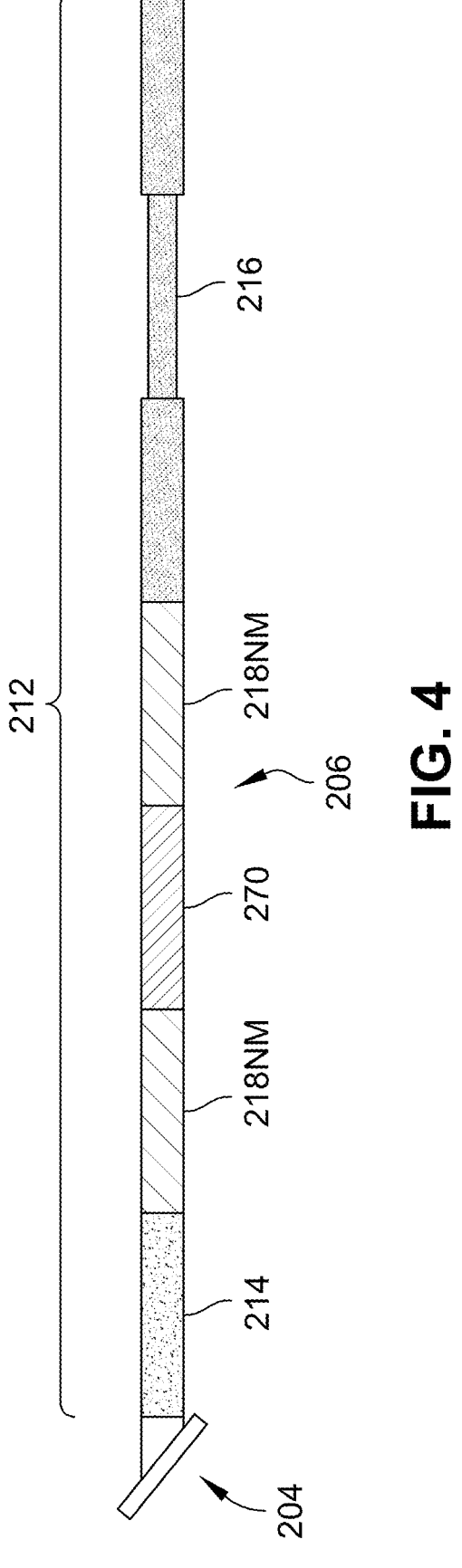
FIG. 4 is a schematic, side view of a drill string with a built-in wireless telemetry system, in accordance with an example embodiment of the present disclosure.

FIG. 4 illustrates another embodiment of the wireless data telemetry system 212, as incorporated in the drill string 206, in accordance with the present embodiment. It is noted that similarly numbered parts as above can be expected to be constructed and function in a similar manner as described previously, unless otherwise expressly stated. The wireless data telemetry system 212 can further include a drill head wireless transmitter 214 (e.g., a sonde) incorporated in the drill head 204 and one or more data link transceivers 216 releasably mounted within the drill string 206, along with a further magnetometer module 270. The magnetometer module 270 is placed between the drill head wireless transmitter 214 and the first data link transceiver 216, separated from each by at least one section of non-magnetic drill rods 218NM (e.g., one non-magnetic drill rod up to, for example, at least 10 feet thereof) to minimize electromagnetic interference with the magnetometer module 270. The magnetometer module 270 can be configured to serve both as a data link (e.g., like 216) and to provide and convey magnetometer data (e.g., compass data-right/left movement). In an embodiment, the magnetometer module 270 can be constructed similar to a data link transceiver 216 with a couple of notable exceptions. The magnetometer module 270 can include a magnetometer unit (not shown) communicatively coupled within that magnetometer module 270 and can be non-magnetically encased (e.g., using austenitic steel or another durable, non-magnetic metal or alloy) to avoid interference with the operation of the magnetometer unit. Thus, the wireless data telemetry system 212, using the magnetometer module 270, can additionally communicate left/right movements and/or compass bearings of the drill string 206 to the related HDD system. In an embodiment, a sonde (e.g., the drill head wireless transmitter 114) can include a magnetometer (not shown), instead of using a separate magnetometer module 270.

Figure 5:
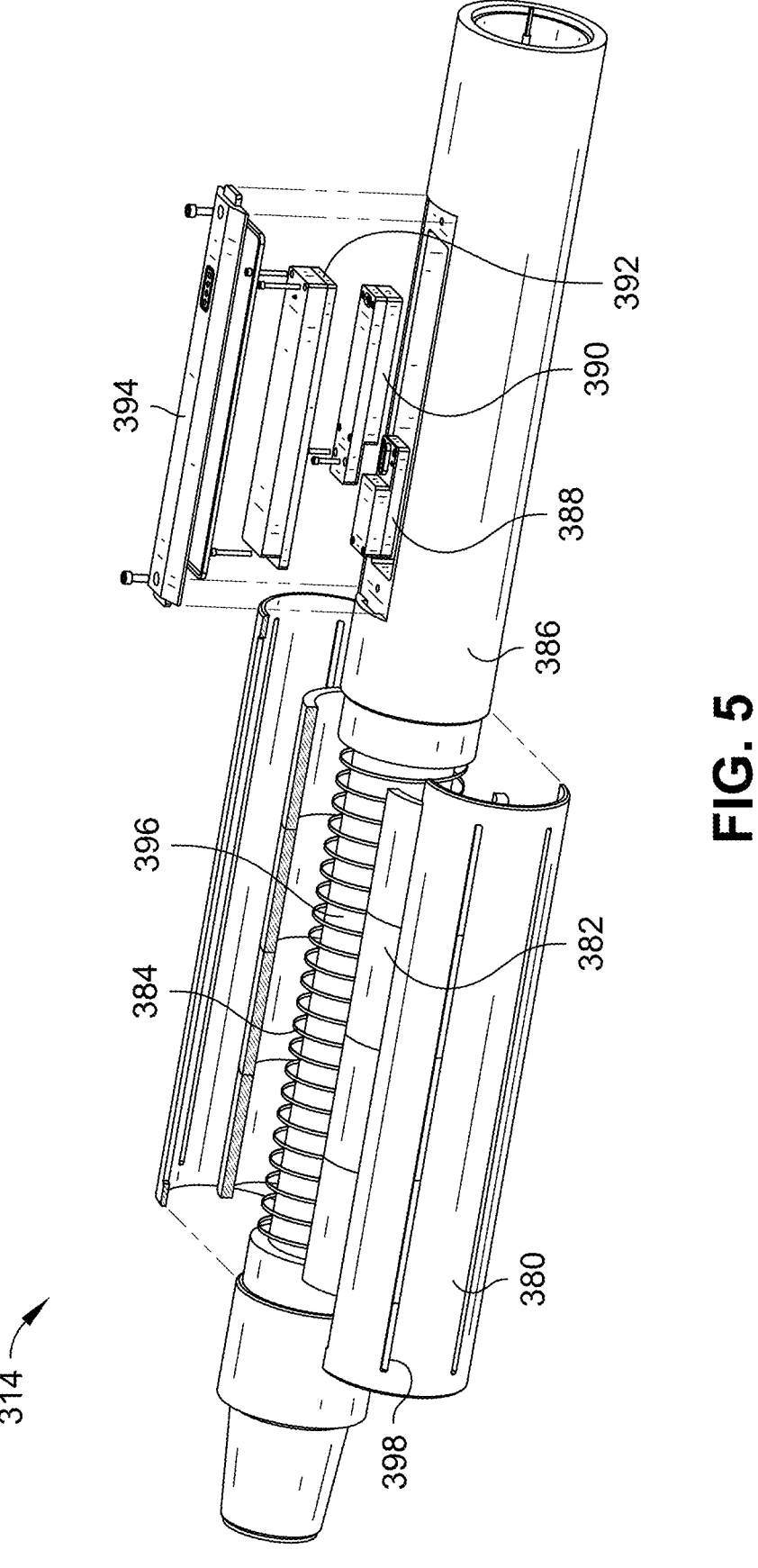
FIG. 5 is an exploded, side isometric view of a transmitter integrated with a drill housing, in accordance with an example embodiment of the present disclosure.
Figure 6:
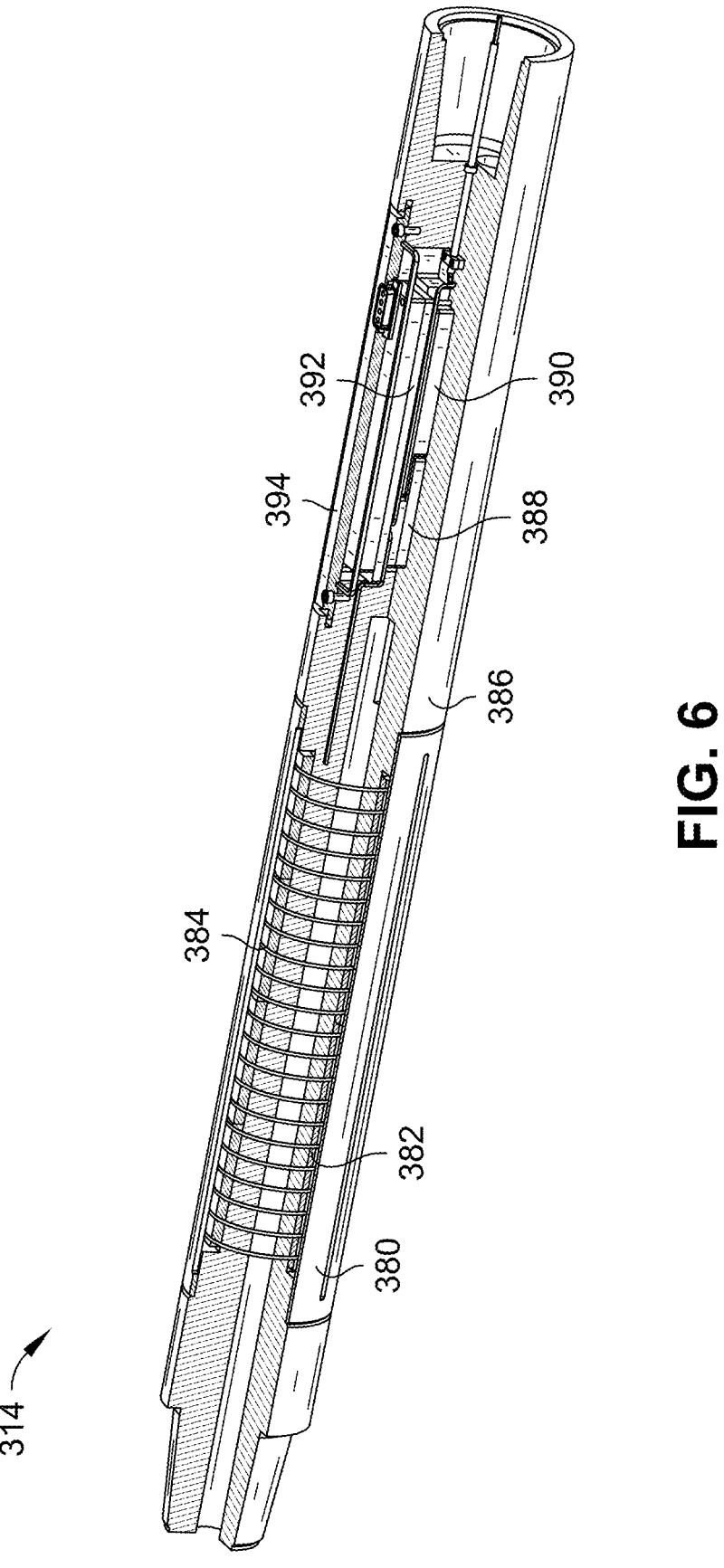
FIG. 6 is a partially cutaway, side isometric view of the transmitter integrated with a drill housing, as shown in FIG. 5.
Figure 7:
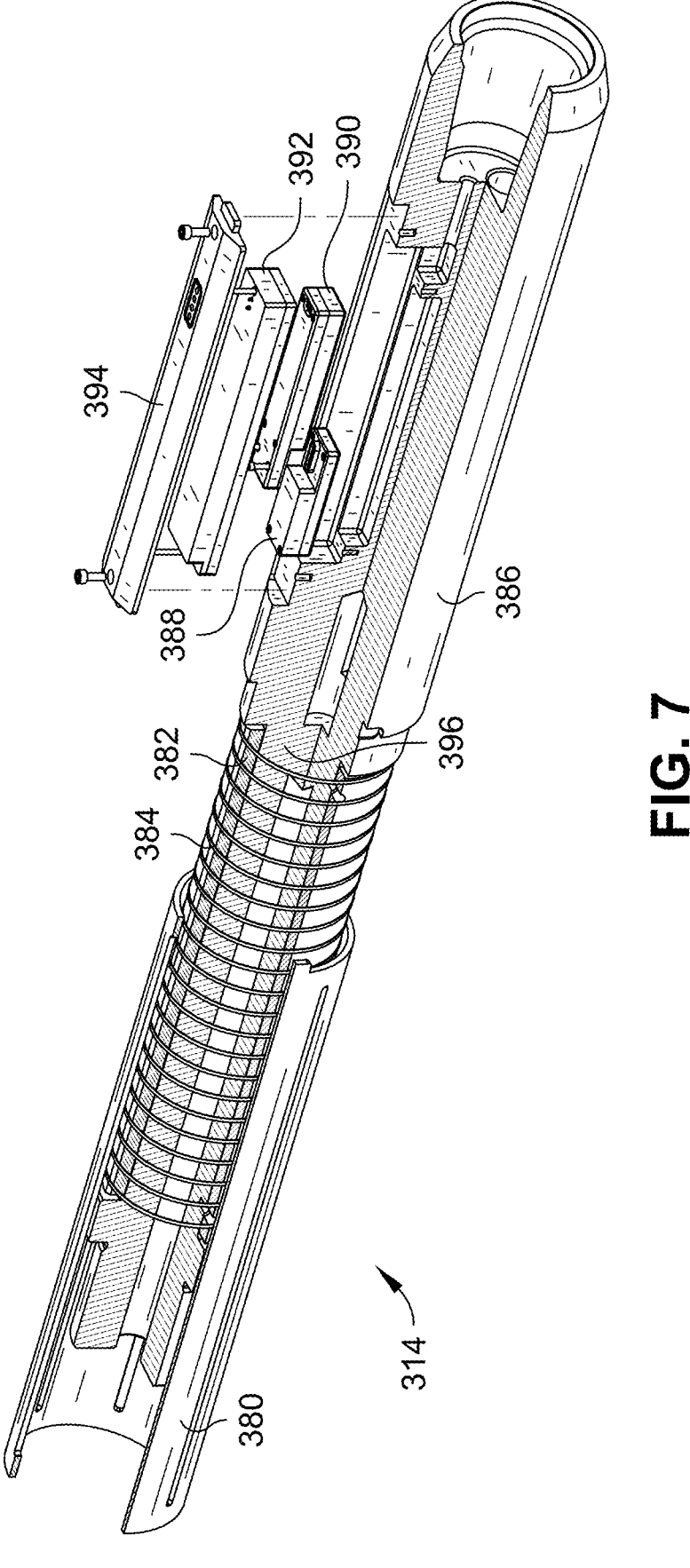
FIG. 7 is a solid model version of the partially cutaway, side isometric view of the transmitter integrated with a drill housing shown in FIG. 6.
Figure 8:
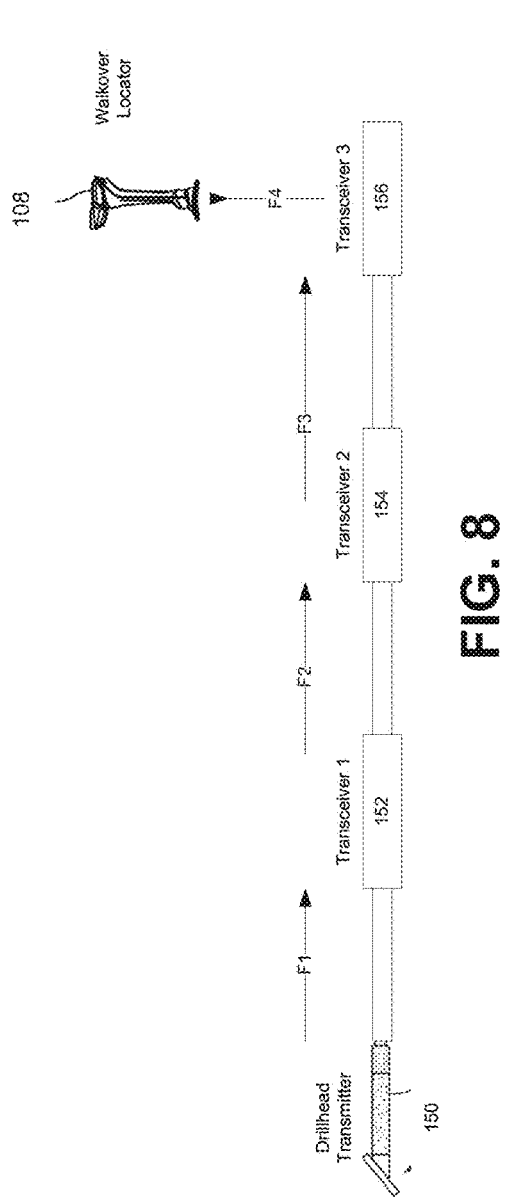
FIG. 8 is a diagrammatic illustration of the operation of a wireless telemetry system as illustrated in FIGS. 1A through 3, in accordance with an example embodiment of the present disclosure.
Figure 9:
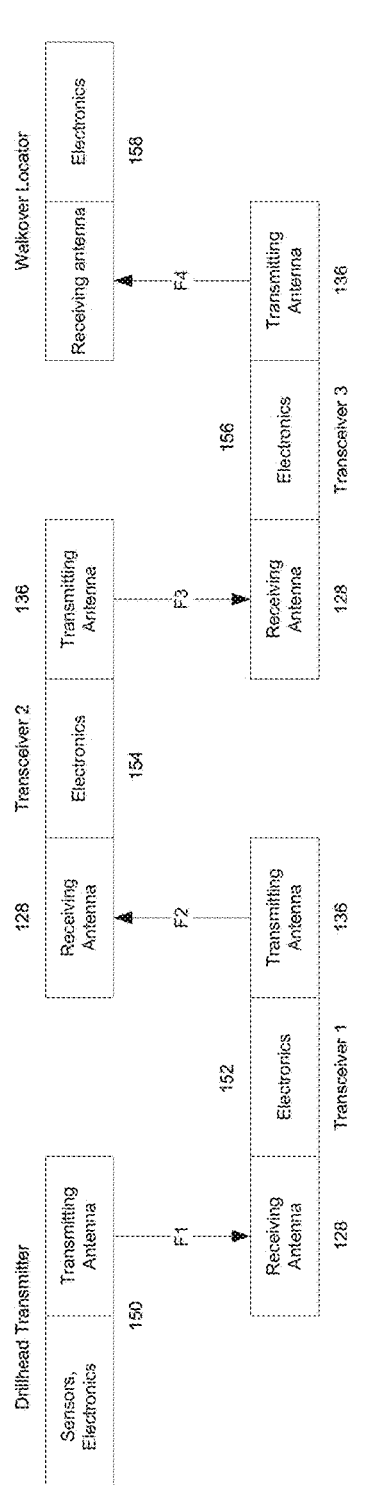
FIG. 9 is another diagrammatic illustration of the opera- tion of a wireless telemetry system as illustrated in FIGS. 1A through 3, in accordance with an example embodiment of the present disclosure.

FIGS. 5-7 illustrate a drill head wireless transmitter 314, in accordance with another embodiment of the present disclosure. The drill head wireless transmitter 314 can be used, for example, to wirelessly communicate with a drill rig 102, a walkover locator 108, and/or at least one data link transceiver 116. The drill head wireless transmitter 314 can include, for example, a wear protection shell 380, a ferrite antenna core 382, a wire coil 384 (e.g., a copper wire coil), an integrated transmitter unit 386, a wiring compartment 388 (e.g., including the related wiring), an electronic compartment 390 (e.g., including the related electronic components), a battery compartment 392 (e.g., carrying the related batteries), a compartment cover or shield 394, and a central structural member 396 (e.g., metal pipe/cylinder), mechanically coupled and, as needed, electrically coupled with one another to yield a functional drill head wireless transmitter 314. In an embodiment, the wire coil 384 is electrically coupled with the wiring associated with the wiring compartment 388 and with one or more electronic components of the electronic compartment 390, and, working in conjunction with the ferrite antenna core 382, is thus configured to generate one or more wireless signals (e.g., a radio-frequency signal(s)) as part of that antenna structure.

The arrangement of the wear protection shell 380, the ferrite antenna core 382, the wire coil 384, and the central structural member 396 can facilitate a wireless communication (e.g., a radio-frequency signal) range of more than 100 meters (m) through the ground. In an embodiment, the signal range, even in the ground, can be at least 150 m and possibly over 200 m. The arrangement can promote such a range because it minimizes the formation of eddy currents that can otherwise interfere with signal transmission from the antenna. As best shown in FIGS. 6 and 7, the central structural member 396 can be surrounded by the ferrite antenna core 382, with the wire coil 384 then surrounding the ferrite antenna core 382. In an embodiment, the ferrite antenna core 382 and the wire coil 384 together serve as the antenna (e.g., antenna assembly) for the drill head wireless transmitter 314. In an embodiment, the antenna assembly (382, 384) is not surrounded by or otherwise contained within a metal structural member that can potentially generate eddy currents, for example, during drilling, or otherwise attenuate the transmission of a signal from the antenna assembly.

In an embodiment, the antenna components 382, 384 can be surrounded by a wear protection shell 380. In an embodiment, the wear protection shell 380 can be self-sufficient structural member (e.g., not a coating). In an embodiment, the wear protection shell 380 can be made of a non-conductive material, such as a plastic or a non-conductive composite (e.g., fiber glass) or a substantially non-conductive material, to avoid or minimize eddy current generation therefrom. The wear protection shell 380 can be further chosen for its wear resistance and durability, as the part may not necessarily be designed as a main load bearing member (instead, central structural member 396 can be intended for that purpose). In an embodiment, the wear protection shell

380 may incorporate a wear-resistant coating (e.g., a ceramic or ceramic composite) formed thereon. In an embodiment, the wear protection shell 380 may be in the form of an integral or multi-part sleeve or sheath that can be readily replaced around the antenna of the drill head wireless transmitter 314.

In an embodiment, the wear protection shell 380 can be selectably slid into place relative to the antenna components 382, 384. In an embodiment, the portions of a multi-part wear protection shell 380 may releasably connect (e.g., snap or slide fit) with one another so as be readily switched out when replacement thereof is dictated. In an embodiment, the wear protection shell 380 may include one or more mechanical keys (e.g., to connect multi-section wear protection shell together; and/or to connect it to the integrated transmitter 386) to retain it in place relative to the antenna components 382, 384 and/or to limit any rotation thereof relative to such components and/or the integrated transmitter 386. In an embodiment, the wear protection shell 380 may be held in place, at least in part, using one or more threaded fasteners (not shown). In an embodiment, the wear protection shell 380 may be five millimeters (mm) thick but other thicknesses (e.g., 1-5 mm) are contemplated.

In an embodiment, the wear protection shell 380 can include one or more slots 398 therein. The one or more slots 398 in the wear protection shell 380 can help minimize the formation of eddy currents in the wear protection shell 380. In an embodiment, the wear protection shell 380 may include, for example, 2-6 slots 398. The number of slots 398 may be chosen based upon the ability thereof to reduce the formation of eddy currents (e.g., favoring using more slots 398) relative to the overall strength (e.g., favoring fewer slots) of the wear protection shell 380. In an embodiment, the slots 398 may extend at least a length of at least one of the ferrite antenna core 382 and/or the wire coil 384, with the wear protection shell 380 extending beyond and thus encasing the antenna components 382, 384. In an embodiment, the provision of a sufficient number of slots 398 in the wear protection shell 380 to reduce the ability to generate eddy currents therein may permit the use of a metal material (e.g., particular a lower conductivity metal or alloy such as stainless steel) or a carbon composite as the wear protection shell 380.

In an embodiment, the central structural member 396 can be a portion of the drill head wireless transmitter 314 that extends beyond a section thereof housing the wiring compartment 388, the electronic compartment 390, and the battery compartment 392. The central structural member 396 can carry and otherwise support the ferrite antenna core 382 and the wire coil 384 (e.g., the antenna components), along with the wear protection shell 380. In an embodiment, the central structural member 396 can be a centered pipe structure (e.g., made of steel or other structural metal) and further may have no slots therein, which might otherwise reduce the strength and/or durability thereof. In an embodiment, the central structural member 396 can be a pipe or otherwise be hollow to provide a flow path (e.g., for mud and/or water) therethrough.

Since the antenna components 382, 384 can be located outside of the central structural member 396, any potential adverse effects on the antenna operation from eddy currents developing in the central structural member 396 (e.g., during drill rotation) may be minimized or even avoided. Additionally, since the antenna components 382, 384 can be housed separate from the wiring compartment 388, the electronic compartment 390, and the battery compartment 392, the antenna size (e.g., length and/or diameter) can potentially be increased relative to prior versions. These various factors, along with using a wear protection shell 380 configured to minimize the generation of any eddy currents therein, may contribute to the drill head wireless transmitter 314 having a signal range (e.g., a radio-frequency signal transmission range) of at least 150 m (e.g., 160 m) and possibly over 200 m, even through the ground.

There can be further advantages for housing the wiring compartment 388, the electronic compartment 390, and the battery compartment 392 distinct from the antenna components 382, 384. In an embodiment, providing a separate electronic compartment 390 can make the electronics therein more readily accessible (e.g., for repair and/or replacement thereof). In an embodiment, providing a separate electronic compartment 390 can allow for additional sensor modules (e.g., for measuring global positioning (GPS), pressure, temperature, direction (e.g., compass direction), and/or acceleration) to be used. In an embodiment, providing a separate battery compartment 392 can facilitate the use of more batteries (e.g., rechargeable batteries), thereby extending operating time of the unit.

While the arrangement of the wear protection shell 380, a ferrite antenna core 382, and a wire coil 384 relative to a central structural member 396 have been discussed in detail with respect to a drill head wireless transmitter 314, it is to be understood that this technology can be used in conjunction with a given data link transceiver 116, 216. That is, a given data link transceiver 116, 216 can, for example, be provided with slotted and/or substantially non-conductive outer shell/protective member to minimize any eddy current formation. Doing so may improve the transmission range (e.g., to 150 m or more) of the antennas associated with those units (for example, by reducing eddy current effects and/or permitting a larger antenna to be used). Further, the use of separate compartments for each of the wiring compartment 388, the electronic compartment 390, and the battery compartment 392 and/or being housed distinct from any antenna components thereof may be applicable to any or all of a given drill head wireless transmitter 114, 214 and/or a given data link transceiver 116, 216. Thus, the technology associated with the drill head wireless transmitter 314 can, where applicable, be incorporated within any of the drill string tools incorporating an antenna within the wireless data telemetry systems 112, 212 and be within the scope of the present disclosure.

In an embodiment, the present wireless data telemetry systems 112, 212 and/or the drill head wireless transmitter 314 may be applicable to other drilling situations. In an embodiment, the present wireless data telemetry systems 112, 212 and/or the drill head wireless transmitter 314 may be used in conjunction with deep drilling situations (e.g., an oil and/or gas drilling rig), facilitating communications with the drill head via wireless communication along the drill string to an above-ground drilling location. In an embodiment, the present wireless data telemetry systems 112, 212 and/or the drill head wireless transmitter 314 may be applicable to deep drilling situations, for example, upon changing from a vertical drilling aspect to a horizontal or an otherwise off-vertical aspect. In a deep drilling embodiment, the telemetry system 112, 212 and/or the drill head wireless transmitter 314 may be maintained in a sleep or off mode until going off-vertical, as depth is the only direction in question during vertical drilling, and that can be measured by length of the drill string added. In an embodiment, the present wireless data telemetry systems 112, 212 and/or the drill head wireless transmitter 314 may be applicable to hole formation for structural pilings (e.g., monitoring the depth and/or the verticality of a given hole formed using a structural piling drilling rig). It is to be understood that a given drilling rig appropriate for these other types of drilling operations may be exchanged for the HDD drill rig 102 and be within the scope of the present disclosure.

The wireless data telemetry systems 112, 212 can include various features. The distinct units of the wireless data telemetry systems 112, 212 can communicate via Bluetooth or other wireless protocols, while components within a given unit may be hard-wired and/or wirelessly coupled with one another. In an embodiment, the wireless data telemetry systems 112, 212 can be configured as a signal repeater unit, permitting one or more signals to be repeated and/or boosted (e.g., by one or more data link transceivers 116, 216) from an initial point (e.g., a drill head wireless transmitter 114, 214 and/or a magnetometer module 270) along the path of the drill string 106, 206 to a location distant from the initial point. The location distant from the initial point may be a location where the data signal(s) may be sufficiently received and registered by, for example, a walk-over locator (e.g., 108) and/or a drilling display (e.g., 110). In an embodiment, the drill head wireless transmitter 114, 214, 314 and the at least one data link transceiver 116 of the present wireless data telemetry system 112, 212 can together wirelessly communicate one or more data signals beyond the drill head wireless transmitter 114, 214, 314 and along at least a portion of the drill string 106, 206, to a position otherwise out of range of the initial transmission of the drill head wireless transmitter 114, 214, 314. In an embodiment, the data link transceivers 116, 216 can be left off and/or in a sleep mode until needed (e.g., walk-over locator 108 out of range due to an object such as a river, railroad, and/or highway). In an embodiment, a sonde (e.g., the drill head wireless transmitter 114, 314) can include a magnetometer (not shown), instead of using a separate magnetometer module 270. In an embodiment, the wireless data telemetry systems 112, 212 and/or a drill head wireless transmitter 314 can be used as a kit with an existing drilling system (e.g., HDD system 100). That is, an existing drilling system can be retrofitted to incorporate a given wireless data telemetry system 112, 212 and/or a drill head wireless transmitter 314.

The HDD system 100, the wireless data telemetry system 112, 212, and/or a drill head wireless transmitter 314 may be controlled by one or more computing systems having a processor configured to execute computer readable program instructions (i.e., the control logic) from a non-transitory carrier medium (e.g., storage medium such as a flash drive, hard disk drive, solid-state disk drive, SD card, optical disk, or the like). The computing system can be connected to various components of the analytic system, either by direct connection, or through one or more network connections (e.g., local area networking (LAN), wireless area networking (WAN or WLAN), one or more hub connections (e.g., USB hubs), and so forth). For example, the computing system can be communicatively coupled (e.g., hard-wired or wirelessly) to the controllable elements (e.g., HDD system 100 and/or the wireless data telemetry system 112, 212). The program instructions, when executing by the processor, can cause the computing system to control the HDD system 100 and/or the wireless data telemetry system 112, 212. In an implementation, the program instructions form at least a portion of software programs for execution by the processor.

The processor provides processing functionality for the computing system and may include any number of processors, micro-controllers, or other processing systems, and resident or external memory for storing data and other information accessed or generated by the computing system.

The processor is not limited by the materials from which it is formed or the processing mechanisms employed therein and, as such, may be implemented via semiconductor(s) and/or transistors (e.g., electronic integrated circuits (ICs)), and so forth.

The non-transitory carrier medium is an example of device-readable storage media that provides storage functionality to store various data associated with the operation of the computing system, such as a software program, code segments, or program instructions, or other data to instruct the processor and other elements of the computing system to perform the techniques described herein. The carrier medium may be integral with the processor, stand-alone memory, or a combination of both. The carrier medium may include, for example, removable and non-removable memory elements such as RAM, ROM, Flash (e.g., SD Card, mini-SD card, micro-SD Card), magnetic, optical, USB memory devices, and so forth. In embodiments of the computing system, the carrier medium may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The computing system can include one or more displays to display information to a user of the computing system. In embodiments, the display may comprise a CRT (Cathode Ray Tube) display, an LED (Light Emitting Diode) display, an OLED (Organic LED) display, an LCD (Liquid Crystal Diode) display, a TFT (Thin Film Transistor) LCD display, an LEP (Light Emitting Polymer), or PLED (Polymer Light Emitting Diode) display, and so forth, configured to display text and/or graphical information such as a graphical user interface. The display may be backlit via a backlight such that it may be viewed in the dark or other low-light environments. The display may be provided with a touch screen to receive input (e.g., data, commands, etc.) from a user. For example, a user may operate the computing system by touching the touch screen and/or by performing gestures on the touch screen. In some embodiments, the touch screen may be a capacitive touch screen, a resistive touch screen, an infrared touch screen, combinations thereof, and the like. The computing system may further include one or more input/output (I/O) devices (e.g., a keypad, buttons, a wireless input device, a thumbwheel input device, a trackstick input device, and so on). The I/O devices may include one or more audio I/O devices, such as a microphone, speakers, and so on.

The computing system may also include a communication module representative of communication functionality to permit computing device to send/receive data between different devices (e.g., components/peripherals) and/or over the one or more networks. The communication module may be representative of a variety of communication components and functionality including, but not necessarily limited to: a browser; a transmitter and/or receiver; data ports; software interfaces and drivers; networking interfaces; data processing components; and so forth.

The one or more networks are representative of a variety of different communication pathways and network connections which may be employed, individually or in combinations, to communicate among the components of the drilling system. Thus, the one or more networks may be representative of communication pathways achieved using a single network or multiple networks. Further, the one or more networks are representative of a variety of different types of networks and connections that are contemplated including, but not necessarily limited to: the Internet; an intranet; a Personal Area Network (PAN); a Local Area Network (LAN) (e.g., Ethernet); a Wide Area Network (WAN); a satellite network; a cellular network; a mobile data network; wired and/or wireless connections; and so forth. Examples of wireless networks include but are not necessarily limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through Universal Serial Bus (USB), Ethernet, serial connections, and so forth.

The computing system is described as including a user interface, which is storable in memory (e.g., the carrier medium) and executable by the processor. The user interface is representative of functionality to control the display of information and data to the user of the computing system via the display. In some implementations, the display may not be integrated into the computing system and may instead be connected externally using universal serial bus (USB), Ethernet, serial connections, and so forth. The user interface may provide functionality to allow the user to interact with one or more applications of the computing system by providing inputs (e.g., sample identities, desired dilution factors, standard identities, eluent identities/locations, fluid addition flow rates, etc.) via the touch screen and/or the I/O devices. For example, the user interface may cause an application programming interface (API) to be generated to expose functionality to a display and/or control module to configure the application for display by the display or in combination with another display. In embodiments, the API may further expose functionality to configure a display and/or control module to allow the user to interact with an application by providing inputs via the touch screen and/or the I/O devices.

In implementations, the user interface may include a browser (e.g., for implementing functionality of the inline dilution control module). The browser enables the computing device to display and interact with content such as a webpage within the World Wide Web, a webpage provided by a web server in a private network, and so forth. The browser may be configured in a variety of ways. For example, the browser may be configured as a display and/or control module accessed by the user interface. The browser may be a web browser suitable for use by a full resource device with substantial memory and processor resources (e.g., a smart phone, a personal digital assistant (PDA), etc.).

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. The communication between modules in the given drilling system, for example, can be wired, wireless, or some combination thereof. In the case of a software implementation, for instance, a module may represent executable instructions that perform specified tasks when executed on a processor, such as the processor described herein. The program code can be stored in one or more device-readable storage media, an example of which is the non-transitory carrier medium associated with the computing system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A drill string tool for use in a horizontal directional drilling system including a horizontal directional drilling rig and a walkover locator, the drill string tool configured for wireless communication with the walkover locator, the drill string tool comprising:

a central structural member;

a ferrite antenna core surrounding the central structural member;

a wire coil positioned around an outside of the ferrite antenna core, the wire coil and the ferrite antenna core defining an antenna assembly, the antenna assembly configured to wirelessly transmit data signals from electronics associated with the drill string tool;

a conductive wear protection shell mounted around the antenna assembly, the conductive wear protection shell configured to minimize a formation of any eddy currents therein during operation of the antenna assembly, the conductive wear protection shell including at least one slot therein, the at least one slot extending at least a length of at least one of the ferrite antenna core or the wire coil, the at least one slot configured to interrupt eddy current formation within the conductive wear protection shell; and at least one data link transceiver including the antenna assembly and configured to be wirelessly coupled to a drill head wireless transmitter and another data link transceiver, the at least one data link transceiver configured to be physically coupled within a drill string and spaced apart from the drill head wireless transmitter and the other data link transceiver via one or more intervening drill rods, the at least one data link transceiver and the drill head wireless transmitter and the other data link transceiver together configured to wirelessly communicate the data signals along at least a portion of the drill string and with the walkover locator.

2. The drill string tool of claim 1, wherein the conductive wear protection shell is selectably slidable into place over the ferrite antenna core and the wire coil.

3. The drill string tool of claim 1, wherein the conductive wear protection shell is of a multi-part construction.

4. The drill string tool of claim 1, wherein the conductive wear protection shell includes a wear-resistant coating formed thereon.

5. The drill string tool of claim 1, wherein the conductive wear protection shell includes a plurality of slots, each slot extending a length of at least one of the antenna core or the wire coil.

6. The drill string tool of claim 1, wherein the ferrite antenna core and the wire coil comprise a transmission antenna, the transmission antenna configured to transmit a radio-frequency signal at least 150 meters through the ground.

7. The drill string tool of claim 1, wherein the drill string tool is a drill head wireless transmitter.

8. The drill string tool of claim 1, further comprising at least one of a wiring compartment, an electronic compartment, or a battery compartment housed distinct from the antenna assembly.

9. The drill string tool of claim 8, further comprising the electronic compartment, the electronic compartment configured to carry at least one of a global positioning sensor, a pressure sensor, a temperature sensor, a directional sensor, or an acceleration sensor.

10. A wireless data telemetry system for use in a horizontal directional drilling system including a horizontal directional drilling rig and a walkover locator, the horizontal directional drilling system having a drill head and a drill string comprised of a plurality of drill rods, the wireless data telemetry system configured for wireless communication with the walkover locator, the wireless data telemetry system comprising:

a drill head wireless transmitter configured to be incorporated in the drill head of the drilling system, the drill head wireless transmitter configured to generate one or more data signals based on an operation of the drill head, the drill head wireless transmitter comprising:

a central structural member;

an antenna core surrounding the central structural member;

a wire coil positioned around an outside of the antenna core, the wire coil and the antenna core defining an antenna assembly, the antenna assembly configured to wirelessly transmit data signals from electronics associated with the drill head wireless transmitter; and a conductive wear protection shell mounted around the antenna assembly, the conductive wear protection shell configured to minimize a formation of any eddy currents therein during operation of the antenna assembly, the conductive wear protection shell including at least one slot therein, the at least one slot extending at least a length of at least one of the antenna core or the wire coil, the at least one slot configured to interrupt eddy current formation within the conductive wear protection shell; and at least one data link transceiver including the antenna assembly and wirelessly coupled to the drill head wireless transmitter and another data link transceiver, the drill head wireless transmitter and the at least one data link transceiver and the other data link transceiver configured to be physically coupled within the drill string and spaced apart from one another via one or more intervening drill rods, the drill head wireless transmitter and the at least one data link transceiver and the other data link transceiver together configured to wirelessly communicate the one or more data signals beyond the drill head wireless transmitter along at least a portion of the drill string and with the walkover locator.

11. The wireless telemetry system of claim 10, wherein the drill head wireless transmitter further comprising at least one of a wiring compartment, an electronic compartment, or a battery compartment housed distinct from the antenna assembly thereof.

12. The wireless telemetry system of claim 10, wherein at least one given data link transceiver is configured to communicate with at least one of a walk-over locator, a drilling rig, or a drilling display of the drilling system.

13. The wireless telemetry system of claim 10, wherein the drill head wireless transmitter and the at least one data link transceiver together are configured to facilitate wireless transmission of the one or more data signals to a location along the drill string that is at least 150 meters away from the drill head wireless transmitter.

14. The wireless telemetry system of claim 10, wherein the drill head wireless transmitter and the at least one data link transceiver are configured to communicate using a short-range wireless communication technology.

15
16

15. The wireless telemetry system of claim 10, wherein the antenna core and the wire coil comprise a transmission antenna, the transmission antenna configured to transmit a radio-frequency signal at least 150 meters through the ground.

16. A horizontal directional drilling system including a horizontal directional drilling rig and a walkover locator, the horizontal directional drilling system configured for wireless communication with the walkover locator, the horizontal directional drilling system comprising:

a drill head;

a drill string comprised of a plurality of releasably interconnected drill rods, the drill string including a first drill rod in the drill string, the first drill rod releasably connected to the drill head; and a drill head wireless transmitter incorporated in the drill head of the drilling system, the drill head wireless transmitter configured to generate one or more data signals based on an operation of the drill head, the drill head wireless transmitter comprising:

a central structural member;

an antenna core surrounding the central structural member;

a wire coil positioned around an outside of the antenna core, the wire coil and the antenna core defining an antenna assembly, the antenna assembly configured to wirelessly transmit data signals from electronics associated with the drill string;

a conductive wear protection shell mounted around the antenna assembly, the conductive wear protection shell configured to minimize a formation of any eddy currents therein during operation of the antenna assembly, the conductive wear protection shell including at least one slot therein, the at least one slot extending at least a length of at least one of the antenna core or the wire coil, the at least one slot configured to interrupt eddy current formation within the conductive wear protection shell; and at least one data link transceiver including the antenna assembly and configured to be wirelessly coupled to another data link transceiver, which itself is coupled to a further data link transceiver, the at least one data link transceiver configured to be physically coupled within the drill string and spaced apart from the other data link transceiver and the further data link transceiver via one or more intervening drill rods, the at least one data link transceiver and the other data link transceiver and the further data link transceiver together configured to wirelessly communicate the data signals beyond the drill head wireless transmitter along at least a portion of the drill string and with the walkover locator.

17. The horizontal directional drilling system of claim 16, wherein the antenna core and the wire coil comprise a transmission antenna, the transmission antenna configured to transmit a radio-frequency signal at least 150 meters through the ground.

18. The horizontal directional drilling system of claim 16, wherein the drill head wireless transmitter further comprises at least one of a wiring compartment, an electronic compartment, or a battery compartment housed distinct from the antenna assembly.

* * * * *